United States Patent
Wong

(10) Patent No.: US 12,328,804 B2
(45) Date of Patent: Jun. 10, 2025

(54) DETERMINING A LOCATION FOR A PRESENCE SENSOR OR LIGHT SWITCH BASED ON A CONTROL HISTORY

(71) Applicant: SIGNIFY HOLDING B.V., Eindhoven (NL)

(72) Inventor: Chu Fai Chu Leun Wong, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 172 days.

(21) Appl. No.: 18/024,312

(22) PCT Filed: Sep. 2, 2021

(86) PCT No.: PCT/EP2021/074315
§ 371 (c)(1),
(2) Date: Mar. 2, 2023

(87) PCT Pub. No.: WO2022/049221
PCT Pub. Date: Mar. 10, 2022

(65) Prior Publication Data
US 2023/0247743 A1 Aug. 3, 2023

(30) Foreign Application Priority Data
Sep. 4, 2020 (EP) .................................... 20194502

(51) Int. Cl.
*H05B 47/115* (2020.01)
*H05B 47/175* (2020.01)
(52) U.S. Cl.
CPC ......... *H05B 47/115* (2020.01); *H05B 47/175* (2020.01)
(58) Field of Classification Search
CPC ...... H05B 47/115; H05B 47/175; Y02B 20/40
See application file for complete search history.

(56) References Cited

U.S. PATENT DOCUMENTS 9,474,134 B2 10/2016 Knibbe
10,349,494 B2 7/2019 Vangeel et al.
(Continued)

FOREIGN PATENT DOCUMENTS

| CN | 110476485 A | * 11/2019 | ............... E06B 9/24 |
| JP | 5850948 B2 | 2/2016 | |
| WO | WO-2016166023 A1 | * 10/2016 | ......... H05B 37/0227 |

OTHER PUBLICATIONS

Aztiria, Asier, et al., "Learning Frequent Behaviors of the Users in Intelligent Environments," IEEE Transactions on Systems, Man, and Cypernetics: Systems, vol. 43, No. 6, Nov. 2013 (14 Pages).

*Primary Examiner* — Abdullah A Riyami
*Assistant Examiner* — Syed M Kaiser

(57) ABSTRACT

A system (21) is configured to obtain a control history of one or more lighting devices (35,36) of a networked lighting system and detect a regularly occurring sequence of manual light control actions (91.92) based on the control history. The control history describes light control actions and the sequence of manual light control actions comprises a light control action associated with a location. The system is further configured to determine a location for a presence sensor or light switch based on the location associated with the light control action such that the network lighting system is able to trigger one or more of the manual light control actions at an appropriate moment when the presence sensor or light switch is placed at the determined location and output the determined location to a user to facilitate the installation of the presence sensor or light switch in the networked lighting system.

12 Claims, 5 Drawing Sheets

(56) References Cited

U.S. PATENT DOCUMENTS

| | | |
|---|---|---|
| 2015/0019024 A1 | 1/2015 | Sabripour |
| 2018/0132336 A1* | 5/2018 | Chraibi ............... H05B 47/105 |
| 2019/0230775 A1 | 7/2019 | Krajnc |
| 2020/0045796 A1 | 2/2020 | Deixler et al. |

* cited by examiner

DETERMINING A LOCATION FOR A PRESENCE SENSOR OR LIGHT SWITCH BASED ON A CONTROL HISTORY

CROSS-REFERENCE TO PRIOR APPLICATIONS

This application is the U.S. National Phase application under 35 U.S.C. § 371 of International Application No. PCT/EP2021/074315, filed on Sep. 2, 2021, which claims the benefit of European Patent Application No. 20194502.9, filed on Sep. 4, 2020. These applications are hereby incorporated by reference herein.

FIELD OF THE INVENTION

The invention relates to a system for facilitating installation of a presence sensor or light switch in a networked lighting system, said networked lighting system comprising one or more lighting devices.

The invention further relates to a method of facilitating installation of a presence sensor or light switch in a networked lighting system, said networked lighting system comprising one or more lighting devices.

The invention also relates to a computer program product enabling a computer system to perform such a method.

BACKGROUND OF THE INVENTION

The use of presence sensors for automatically activating and deactivating lighting is relatively common in (new) offices and is now also gaining popularity in homes. An example of a popular presence sensor for homes in the Philips Hue Motion Sensor. If a consumer is aware of the benefit of using a presence sensor, then he usually has a certain location in mind.

Furthermore, US 2015/019024 A1 discloses a controller that runs a built-in test during the installation process to determine the optimal placement of a sensor node. The built-in test attempts to measure and optimize multiple parameters while maintaining sufficient energy to charge the system. An example of such a parameter is the performance of a PIR occupancy sensor.

However, such a test is mainly useful if the installer has an idea of approximately where he wants to place the sensor node. In offices, the purpose of a presence sensor and therefore the approximate location of the presence sensor is often clear. In homes, a presence sensor can typically be used for different purposes at different locations. Consumers may not be aware of the benefit of the use of a presence sensor and if they are, they may not be aware that there are better locations in the house to place the presence sensor than the one they had in mind. In this case, the user may not know at which approximate location the presence sensor would have benefit or would have most benefit and may therefore not know at which initial position to run a test. Similarly, a user may not know at which approximate location a (e.g. wireless) light switch would have benefit or would have most benefit.

SUMMARY OF THE INVENTION

It is a first object of the invention to provide a system, which determines a location for a presence sensor or light switch even if an initial position for the presence sensor or light switch is not known yet.

It is a second object of the invention to provide a method, which determines a location for a presence sensor or light switch even if an initial position for the presence sensor or light switch is not known yet.

In a first aspect of the invention, a system for facilitating installation of a presence sensor or light switch in a networked lighting system, said networked lighting system comprising one or more lighting devices, comprises at least one input interface, at least one output interface, and at least one processor configured to obtain, via said at least one input interface, a control history of said one or more lighting devices, said control history describing a plurality of light control actions, detect a regularly occurring sequence of manual light control actions based on said control history, said sequence of manual light control actions comprising a light control action associated with a location, determine a location for said presence sensor or light switch based on said location associated with said light control action such that said network lighting system is able to trigger one or more of said manual light control actions of said sequence at an appropriate moment when said presence sensor or light switch is placed at said presence sensor or light switch location, and output said presence sensor or light switch location to a user via said at least one output interface to facilitate said installation of said presence sensor or light switch.

With this system, when a user is installing a new presence sensor or (e.g. wireless) light switch or is considering installing a new presence sensor or light switch, he can be provided with tailored user guidance, even if he does not know at which approximate location the presence sensor or light switch would have benefit or would have most benefit. This tailored user guidance includes a suggested location for the new presence sensor or light switch and may include a suggestion on how to configure it (e.g. which lighting device(s) it should activate). The system may optionally configure the new presence sensor or light switch automatically.

The tailored user guidance is determined based on the lighting system's control history, e.g. by employing pattern recognition on the historical data. Users often have multiple routines in their home, of which they may be unaware. For example, a user may typically turn on the bedroom light, then the hallway light, and then the bathroom light before heading downstairs to turn on the living room light. These routines may be deduced from the control history, i.e. usage data.

The location associated with the light control action may be a location of at least one of the one or more lighting devices and/or a location of a light switch, for example. In the above example, the determined presence sensor location may be the bedroom and all four actions may be performed when movement is detected in the bedroom (e.g. at night) or the determined presence sensor location may the hallway and the last three actions may be performed when the user turns on then bedroom light and then movement is detected in the hallway, for example.

Said at least one processor may be configured to program said networked lighting system to trigger said one or more light control actions upon detecting presence with said presence sensor or detecting interaction with said light switch. By automatically configuring the lighting system, e.g. a bridge or the presence sensor or light switch, the user does not have to do this manually. Good configuration settings may be determined based on the control history.

Said at least one processor may be configured to determine, from said control history, a subset of said one or more lighting devices, said subset being associated with said one or more light control actions and program said networked lighting system to control said subset of lighting devices upon detecting presence with said presence sensor or detecting interaction with said light switch.

Said at least one processor may be configured to determine, from said control history, a light setting associated with at least one of said one or more light control actions and program said networked lighting system to control at least one of said subset of lighting devices according to said light setting upon detecting presence with said presence sensor or detecting interaction with said light switch. A light setting may comprise a color and/or a light output level, for example.

Said at least one processor may be configured to determine, from said control history, one or more time periods associated with said sequence and program said networked lighting system to control said subset of lighting devices upon detecting presence with said presence sensor or detecting interaction with said light switch in said one or more time periods. This is beneficial if it is only appropriate to trigger the one or more control actions of the sequence at one or more certain time periods of the day and/or the week, for example. If this is not used, then any moment may be considered to be an appropriate moment to trigger the one or more control actions.

Said at least one processor may be configured to determine a likelihood that said control action is being performed as part of said sequence when said control action is performed in one or more time periods associated with said sequence and output said presence sensor or light switch location to said user upon determining that said likelihood exceeds a threshold. For example, there may be more than two regularly occurring sequences that comprise an action of a user switching on the toilet light and when the user switches on the toilet light, a likelihood that the succeeding light control actions of any one of these sequences is performed may be less than 50%, which will typically be considered to be too low to let the succeeding light control actions be performed automatically.

Said at least one processor may be configured to detect a regularly occurring further sequence of manual light control actions based on said control history, said further sequence of manual light control actions comprising a further light control action associated with a further location, determine a merit of said sequence and a further merit of said further sequence, and select said sequence upon in dependence on said merit exceeding said further merit. This makes it possible to determine the best position for the presence sensor or light switch rather than the first position that is acceptable.

Said at least one processor may be configured to determine said merit of said sequence by determining a likelihood that said control action is being performed as part of said sequence when said control action is performed in one or more time periods associated with said sequence and determine said further merit of said further sequence by determining a likelihood that said further control action is being performed as part of said further sequence when said further control action is performed in one or more time periods associated with said further sequence. For example, there may be a 90% likelihood that in a certain time period a user turns on the bedroom light, upstairs hallway light, downstairs hallway light and lavatory light in sequence and an 80% likelihood that a user turns on the porch light, the downstairs hallway light, the lavatory light, the living room light and the kitchen light in sequence. By placing a presence sensor in the bedroom instead of on the porch, it becomes more likely that the control actions that will be automatically performed are desired actions.

Said at least one processor may be configured to determine said merit of said sequence by determining a quantity of said one or more light control actions and determine said further merit of said further sequence by determining a quantity of one or more further light control actions of said further sequence to be triggered upon detecting presence with said presence sensor or detecting interaction with said light switch. Typically, the more control actions that can be automated, the better. However, multiple parameters may be taken into account, e.g. both likelihood and quantity. These multiple parameters may be weighted differently.

In a second aspect of the invention, a method of facilitating installation of a presence sensor or light switch in a networked lighting system, said networked lighting system comprising one or more lighting devices, comprises obtaining a control history of said one or more lighting devices, said control history describing a plurality of light control actions, detecting a regularly occurring sequence of manual light control actions based on said control history, said sequence of manual light control actions comprising a light control action associated with a location, determining a location for said presence sensor or light switch based on said location associated with said light control action such that said network lighting system is able to trigger one or more of said manual light control actions of said sequence at an appropriate moment when said presence sensor or light switch is placed at said presence sensor or light switch location, and outputting said presence sensor or light switch location to a user to facilitate said installation of said presence sensor or light switch. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for facilitating installation of a presence sensor or light switch in a networked lighting system, said networked lighting system comprising one or more lighting devices.

The executable operations comprise obtaining a control history of said one or more lighting devices, said control history describing a plurality of light control actions, detecting a regularly occurring sequence of manual light control actions based on said control history, said sequence of manual light control actions comprising a light control action associated with a location, determining a location for said presence sensor or light switch based on said location associated with said light control action such that said network lighting system is able to trigger one or more of said manual light control actions of said sequence at an appropriate moment when said presence sensor or light switch is placed at said presence sensor or light switch location, and outputting said presence sensor or light switch location to a user to facilitate said installation of said presence sensor or light switch.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
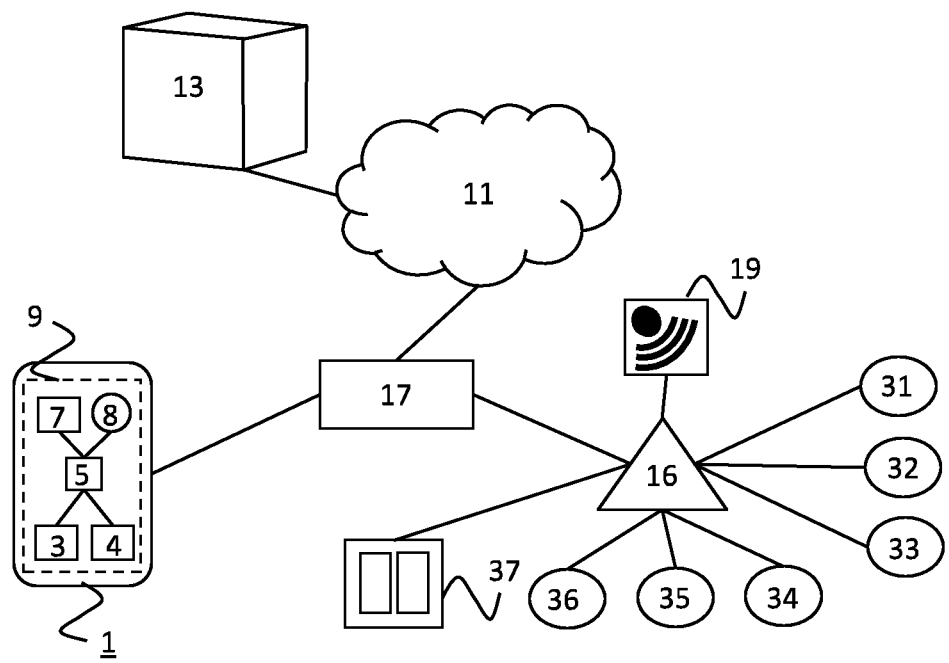
FIG. 1 is a block diagram of a first embodiment of the system.

FIG. 1 shows a first embodiment of the system for facilitating installation of a presence sensor or light switch in a networked lighting system. In this first embodiment, the system is a mobile device 1. The networked lighting system comprises lighting devices 31-36 and at least one light switch 37. Mobile device 1 runs an app for controlling lighting devices 31-36, which may be Philips Hue lamps, for example. The lighting devices 31-36 and the light switch 37 communicate with a (light) bridge 16, e.g. using Zigbee technology. The bridge 16 may be a Philips Hue bridge, for example. The mobile devices 1 is able to control the lighting devices 31-36 via a wireless LAN access point 17 and the bridge 16. The wireless LAN access point 17 is connected to the Internet 11. An Internet server 13 is also connected to the Internet 11.

The mobile device 1 comprises a transceiver 3, a transmitter 4, a processor 5, memory 7, and a display 9. The processor 5 is configured to obtain, via the receiver 3, a control history of the lighting devices 31-36, e.g. from the Internet server 13. The control history describes a plurality of light control actions. The processor 5 is configured to detect a regularly occurring sequence of manual light control actions based on the control history. The sequence of manual light control actions comprises a light control action associated with a location (and possibly further light control actions associated with further locations), e.g. as first light control action in the sequence.

The processor 5 is further configured to determine a location for a presence sensor 19 or light switch based on the location associated with the light control action such that the network lighting system is able to trigger one or more of the manual light control actions of the sequence at an appropriate moment when the presence sensor 19 or light switch is placed at the presence sensor or light switch location, automatically in the case of presence sensor 19, and output the presence sensor or light switch location to a user via the display 9 to facilitate the installation of the presence sensor 19 or light switch. The location associated with the light control action may be a location one of lighting devices 31-36 and/or a location of the light switch 37, for example.

In the embodiment of FIG. 1, the processor 5 is also configured to program the networked lighting system, e.g. the bridge 16, the presence sensor 19 or the light switch, to trigger the one or more light control actions upon detecting presence with the presence sensor 19 or detecting interaction with the light switch. For example, the processor 5 may be configured to determine, from the control history, a subset of the lighting devices 31-36 which is associated with the one or more light control actions and program the networked lighting system to control the subset of lighting devices upon detecting presence with the presence sensor 19 or detecting interaction with the light switch.

Alternatively or additionally, the processor 5 may be configured to determine, from the control history, a light setting associated with at least one of the one or more light control actions and program the networked lighting system to control at least one of the subset of lighting devices according to the light setting upon detecting presence with the presence sensor 19 or detecting interaction with the light switch.

Alternatively or additionally, the processor 5 may be configured to determine, from the control history, one or more time periods associated with the sequence and program the networked lighting system to control the subset of lighting devices upon detecting presence with the presence sensor 19 or detecting interaction with the light switch in the one or more time periods.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-36 are controlled by the mobile device 1 via the bridge 16. In an alternative embodiment, one or more of the lighting devices 31-36 are controlled by the mobile device 1 without a bridge, e.g. directly via Bluetooth or via the wireless LAN access point 17. Optionally, the lighting devices 31-36 are controlled via the cloud, e.g. via Internet server 13. The lighting devices 31-36 may be capable of receiving and transmitting Wi-Fi signals, for example.

Figure 2:
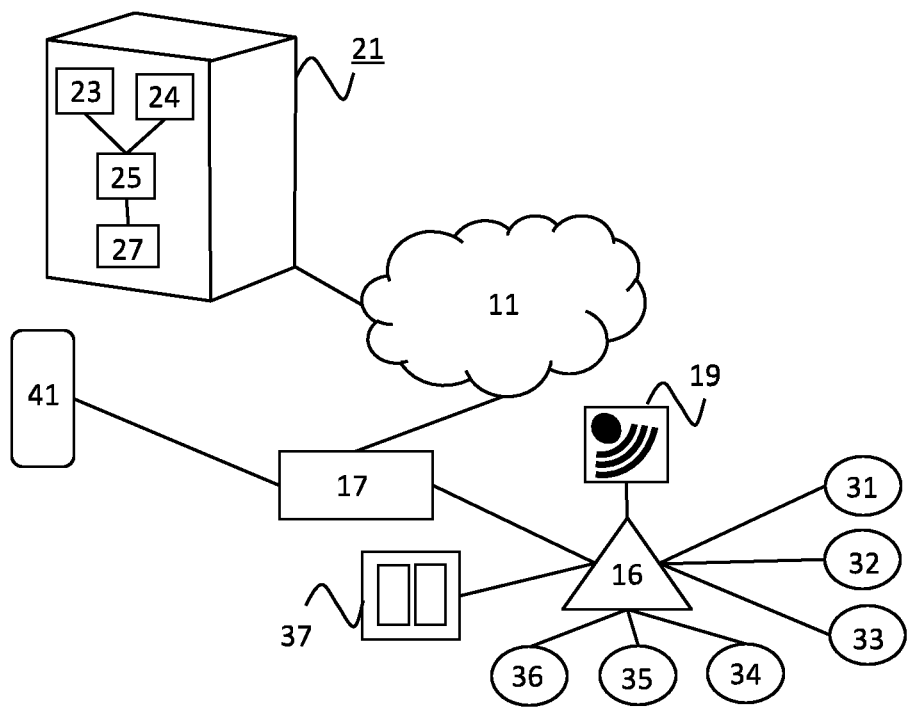
FIG. 2 is a block diagram of a second embodiment of the system.

FIG. 2 shows a second embodiment of the system for facilitating installation of a presence sensor or light switch in a networked lighting system. In this second embodiment, the system is a computer 21. The computer 21 is connected to the Internet 11 and acts as a server. The networked lighting system comprises lighting devices 31-36 and at least one light switch 37.

The computer 21 comprises a receiver 23, a transmitter 24, a processor 25, and storage means 27. The processor 25 is configured to obtain, via the receiver 23, a control history of the lighting devices 31-36, e.g. from the bridge 16. From example, control data may be received from the bridge 16 each time a control command is received by the bridge 16, or on a regular basis, e.g. one time per day. This control data may be stored in the storage means 27 as a control history and may later be retrieved via a data bus, e.g. when the user is preparing to install the presence sensor 19 or light switch. The control history describes a plurality of light control actions.

The processor 25 is further configured to detect a regularly occurring sequence of manual light control actions based on the control history. The sequence of manual light control actions comprises a light control action associated with a location. The processor 25 is further configured to determine a location for a presence sensor 19 or light switch based on the location associated with the light control action such that the network lighting system is able to trigger one or more of the manual light control actions of the sequence at an appropriate moment when the presence sensor 19 or light switch is placed at the presence sensor or light switch location, automatically in the case of presence sensor 19.

The processor 25 is further configured to output the presence sensor or light switch location to a user via the transmitter 24 and the mobile device 41 to facilitate the installation of the presence sensor 19 or light switch. For example, the computer 21 may transmit the presence sensor or light switch location to a mobile device 41 and the mobile device 41 may then display the presence sensor or light switch location on its display.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 2, the computer 21 receives data from and transmits data to the lighting devices 31-36 via the bridge 16. In an alternative embodiment, the computer 21 receives data from and transmits data to one or more of the lighting devices 31-36 without a bridge.

Figure 3:
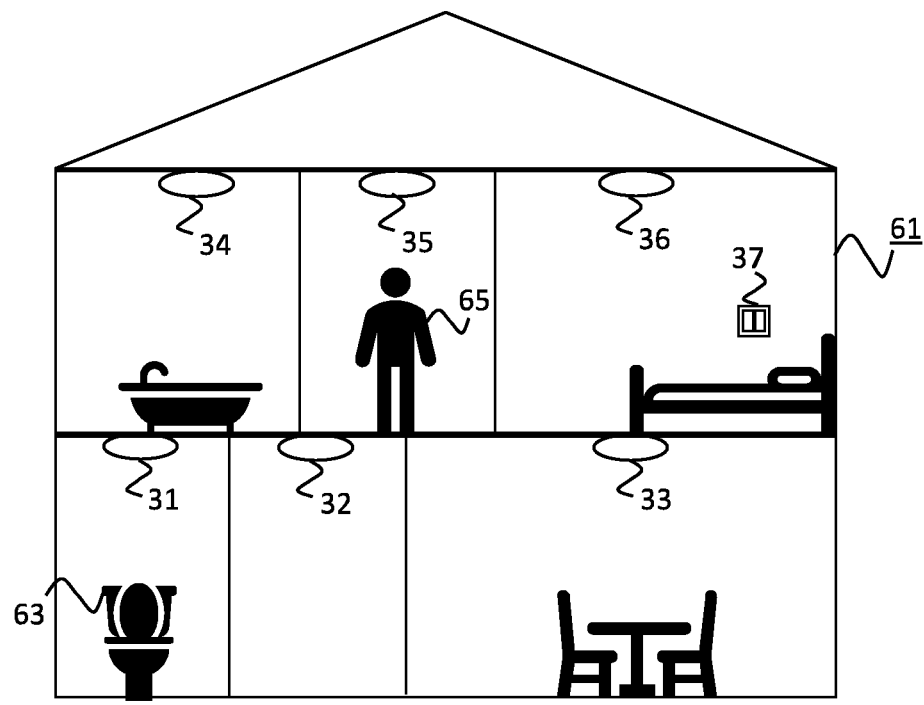
FIG. 3 shows an example of a house in which the system may be used.

FIG. 3 shows an example of a house in which the system may be used. Lighting device 31 is placed in a lavatory on the ground floor of a house 61. The lavatory comprises a toilet 63. Lighting device 32 is placed in a hallway on the ground floor of the house 61. Lighting device 33 is placed in a living room on the ground floor of the house 61. Lighting device 34 is placed in a bathroom on the second floor of the house 61. Lighting device 35 is placed in a hallway on the second floor of the house 61. Lighting device 36 and light switch 37 are placed in a bedroom on the second floor of the house 61.

A user 65 may perform the following actions at night when he goes to the lavatory:
1. gets out of his bed
2. turns on lighting device 36 in his bedroom, e.g. using light switch 37
3. turns on lighting device 35 in the hallway upstairs, e.g. using his mobile phone
4. goes downstairs
5. turns on lighting device 32 in the hallway downstairs
6. turns on lighting device 31 in the lavatory
7. uses the toilet 63 in the lavatory
8. turns off lighting device 31 in the lavatory
9. turns off lighting device 32 in hallway downstairs
10. goes upstairs
11. turns off lighting device 35 in hallway upstairs
12. turns off lighting device 36 in his bedroom
13. returns to bed These actions belong to a reoccurring routine of the user. A user can have multiple of these routines and some of them typically involve light control actions. Users may not be consciously aware of (all) these (sometimes subtle) reoccurring routines. When a user is not aware of (all) these routines, he might not even realize the benefit of installing a presence sensor, let alone know where to (optimally) install it.

When the user 65 is installing and configuring the presence sensor, an app on his mobile device could give him tailored installation and configuration guidance, e.g. suggestions on where to install the sensor (e.g. in the bedroom in the above example) and which lighting devices it should trigger (e.g. lighting devices in bedroom, hallway upstairs, hallway downstairs, lavatory) at which hours of the day (e.g. only between 2 am and 6 am). This will save the user work, as he no longer has to turn on and off light switches when he performs his nightly routine. The lighting system thus becomes more personalized and tailored to the user's needs.

Generally, one or more lighting devices are automatically turned on when presence is detected and are optionally automatically turned off. Generally, one or more lighting devices may be automatically turned off a) when presence is no longer detected for a certain time, b) a certain time after turning on the lighting devices, or c) when presence is detected a second time.

In the above example, the app may recommend that the user installs the presence sensor in the bedroom and in this case, all three options or a subset thereof could be implemented. Option a) should then be implemented by a motion sensor and not by a heat sensor. The certain time in option a) and b) may be learned from the control history to avoid that the lighting devices are turned off before the user returns to bed. If the lighting devices are not turned off automatically, the user has to turn off the lighting devices manually, but this still saves the user the work of manually turning on the lighting devices.

Figure 4:
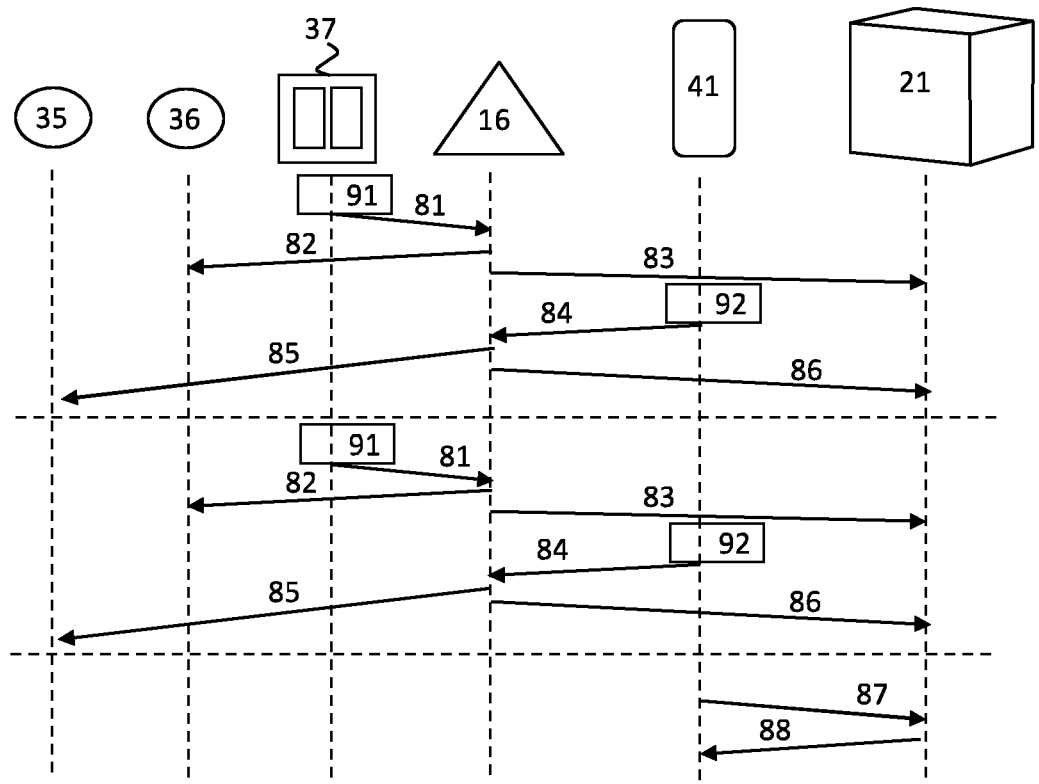
FIG. 4 shows an example of a regular occurring sequence of manual light control actions.

If in the above example, the user would use his mobile phone to turn on lighting device 36 in his bedroom, the app might alternatively recommend that the user installs a light switch in his bedroom and suggest a configuration that turns on lighting devices 36, 35, 32, and 31 when pressing the "on" button between 1:00 and 6:00 am, for example. The bridge 16 of FIG. 2 logs data of all light control actions performed by the user to the cloud, i.e. to Internet server 21. This data, i.e. the control history, may be stored as raw data in a data lake. The Internet server 21 (and the mobile device 1 in the embodiment of FIG. 1) extract the user's reoccurring routines by looking at the user's reoccurring light control patterns over time. This is shown in FIG. 4 with an example of a regular occurring sequence of manual light control actions.

A step 91 comprises the user pressing a button of the light switch 37. A step 81 comprises the light switch 37 informing the bridge 16 that one of the buttons of light switch 37 has been pressed. After the bridge 16 has determined that pressing this button is associated with turning on lighting device 36, the bridge 16 transmits a light command to lighting device 36 in step 82, thereby instructing the lighting device 36 to activate its light source, typically with a specified color and/or light output level. The bridge 16 logs the light control action to the Internet server 21 in step 83.

A step 92 comprises the user pressing a virtual button in a lighting control app on his mobile device 41. A step 84 comprises the mobile device 41 instructing the bridge 16 to turn on the lighting device 35. After receiving this instruction, the bridge 16 transmits a light command to lighting device 35 in step 85, thereby instructing the lighting device 35 to activate its light source. The bridge 16 logs the light control action to the Internet server 21 in step 88. The next day, the same steps 81-88 and 91-92 are repeated.

At a later date, when the user wants to install a presence sensor or when the app running on the mobile device 41, or its user, has decided to check whether installing a presence sensor is beneficial, the mobile device 41 transmits a request to the Internet server 21 in step 87. The Internet server 21 then performs pattern recognitions on the raw data, e.g. stored in a data-lake, to extract user routines and generates tailored user guidance. This user tailored user guidance comprises a suggested location for the presence sensor and may comprise a configuration suggestion with respect to the presence sensor. Alternatively, this configuration may be performed automatically. In step 88, the Internet server 21 then responds back to the app with this tailored user guidance. The app running on the mobile device 41 then provides the suggestion(s) to the user.

In the example of FIG. 4, the suggested location is the starting point of the sequence, i.e. the bedroom, and the triggered lighting devices are the lighting devices 35 and 36. These two light control actions are the first two light control actions of the example described in relation to FIG. 3. The sequence described in that example comprises turning on lighting device 36, turning on lighting device 35, turning on lighting device 32, turning on lighting device 31, turning off lighting device 31, turning off lighting device 32, turning off lighting device 35, and turning off lighting device 36.

Subsequences of a sequence may be considered as well. For example, one of the subsequences of the example described in relation to FIG. 3 comprises turning on lighting device 35, turning on lighting device 32, turning on lighting device 31, turning off lighting device 31, turning off lighting device 32, turning off lighting device 35, and turning off lighting device 36. If this subsequence would be considered to have a higher merit, the hallway upstairs could be recommended as suggested location for the presence sensor.

Figure 5:
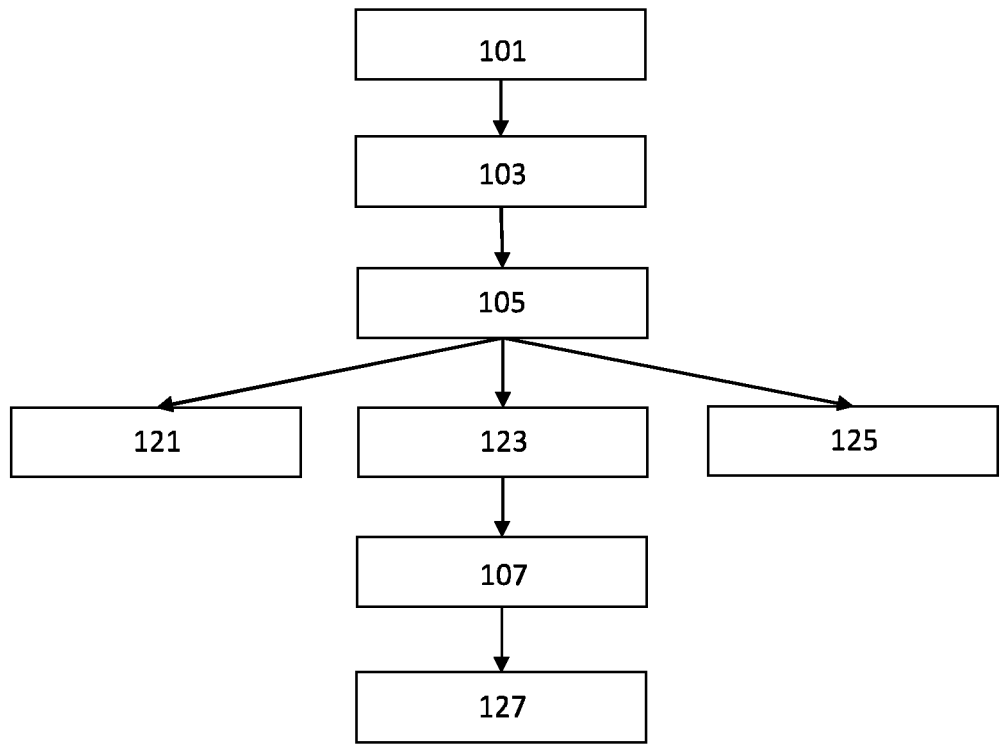
FIG. 5 is a flow diagram of a first embodiment of the method.

A first embodiment of the method of facilitating installation of a presence sensor or light switch in a networked lighting system is shown in FIG. 5. The networked lighting system comprises one or more lighting devices. A step 101 comprises obtaining a control history of the one or more lighting devices. The control history describes a plurality of light control actions. A step 103 comprises detecting a regularly occurring sequence of manual light control actions based on the control history. The sequence of manual light control actions comprises a light control action associated with a location.

A step 105 comprises determining a location for the presence sensor or light switch based on the location associated with the light control action such that the network lighting system is able to trigger one or more of the manual light control actions of the sequence at an appropriate moment when the presence sensor or light switch is placed at the presence sensor or light switch location, automatically in the case of the presence sensor. The location associated with the light control action may be a location of at least one of the one or more lighting devices or a location of a light switch, for example. In the embodiment of FIG. 5, steps 121, 123, and 125 are performed after step 105. Step 121 comprises determining, from the control history, a subset of the one or more lighting devices which is associated with the one or more light control actions. Step 123 comprises determining, from the control history, a light setting associated with at least one of the one or more light control actions. Step 125 comprises determining, from the control history, one or more time periods associated with the sequence.

A step 107 comprises outputting the presence sensor or light switch location determined in step 105 to a user to facilitate the installation of the presence sensor or light switch. A step 127 comprises programming the networked lighting system to trigger the one or more light control actions upon detecting presence with the presence sensor or detecting interaction with the light switch. In the embodiment of FIG. 5, step 127 comprises programming the networked lighting system to control the subset of lighting devices determined in step 121 according to the light setting determined in step 123 upon detecting presence with the presence sensor or detecting interaction with the light switch in the one or more time periods determined in step 125.

Figure 6:
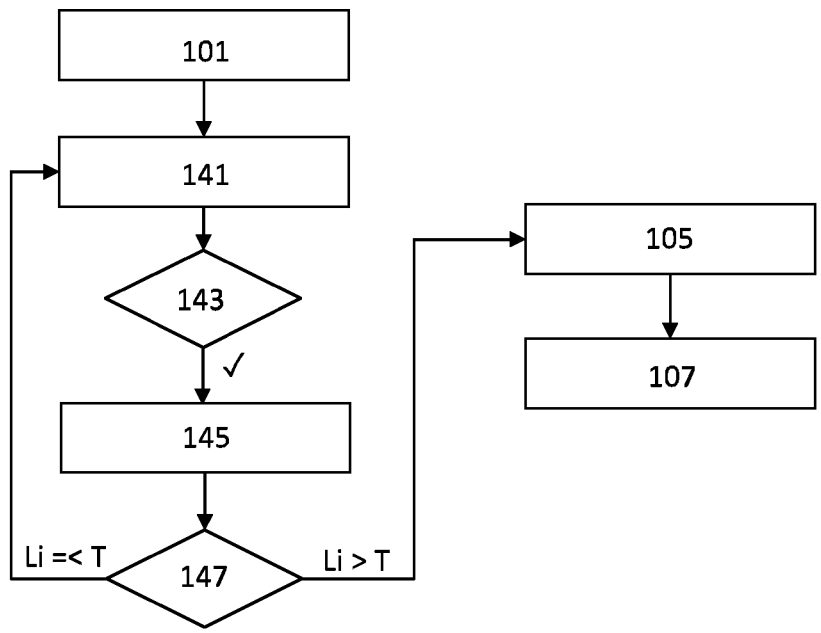
FIG. 6 is a flow diagram of a second embodiment of the method.

A second embodiment of the method of facilitating installation of a presence sensor or light switch in a networked lighting system is shown in FIG. 6. The networked lighting system comprises one or more lighting devices. Step 101 comprises obtaining a control history of the one or more lighting devices. The control history describes a plurality of light control actions.

A step 141 comprises looking for a first or next regularly occurring sequence of manual light control actions in the control history. The sequence of manual light control actions comprises a light control action associated with a location. A step 143 comprises determining whether such a sequence has been detected in step 141. If so, step 145 is performed next.

Step 145 comprises determining a likelihood Li that the control action is being performed as part of the sequence when the control action is performed in one or more time periods associated with the sequence. A step 147 comprises determining whether the likelihood Li exceeds a threshold T. If so, step 105 is performed next. If not, step 141 is repeated and a next regularly occurring sequence of manual light control actions is looked for in the control history.

Step 105 comprises determining a location for the presence sensor or light switch based on the location associated with the light control action such that the network lighting system is able to trigger one or more of the manual light control actions of the sequence at an appropriate moment when the presence sensor or light switch is placed at the presence sensor or light switch location, automatically in the case of the presence sensor. Step 107 comprises outputting the presence sensor or light switch location determined in step 105 to a user to facilitate the installation of the presence sensor or light switch.

Figure 7:
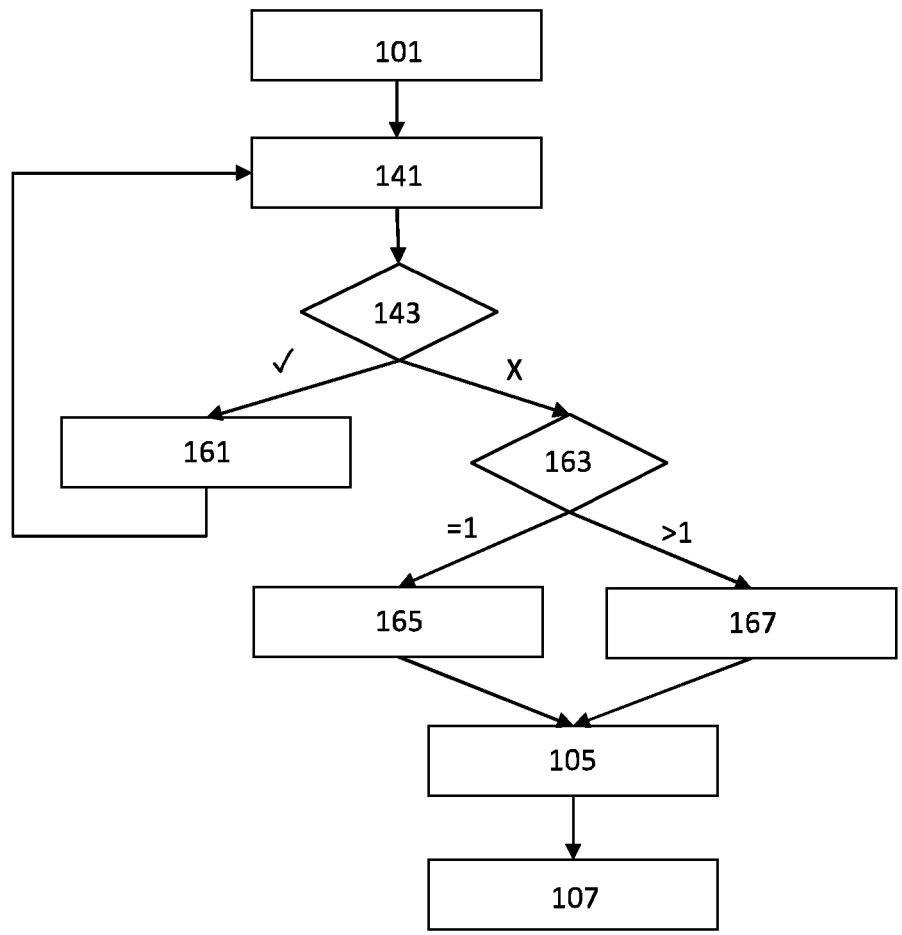
FIG. 7 is a flow diagram of a third embodiment of the method.

A third embodiment of the method of facilitating installation of a presence sensor or light switch in a networked lighting system is shown in FIG. 7. The networked lighting system comprises one or more lighting devices. Step 101 comprises obtaining a control history of the one or more lighting devices. The control history describes a plurality of light control actions.

Step 141 comprises looking for a first or next regularly occurring sequence of manual light control actions in the control history. The sequence of manual light control actions comprises a light control action associated with a location. Step 143 comprises determining whether such a sequence has been detected in step 141. If so, step 161 is performed next. Step 161 comprises determining a merit of the sequence detected in step 141.

In step 161, the merit of the sequence may be determined by determining a likelihood that the control action is being performed as part of the sequence when the control action is performed in one or more time periods associated with the sequence and/or by determining a quantity of the one or more light control actions. Step 141 is repeated after step 161 and a next regularly occurring sequence of manual light control actions is looked for in the control history.

If it is determined in step 143 that no (further) sequence has been detected in step 141, a step 163 is performed. Step 163 comprises determining how many sequences have been determined in the one or more iterations of step 141. If it is determined in step 163 that one sequence has been detected, a step 165 is performed. If it is determined in step 163 that more than one sequence has been detected, a step 167 is performed. Step 165 comprises selecting the one detected sequence. Step 167 comprises selecting one of the multiple sequences detected in step 141. In step 167, the sequence with the highest merit is selected.

Step 105 is performed after steps 165 and 167. Step 105 comprises determining a location for the presence sensor or light switch based on the location associated with the light control action such that the network lighting system is able to trigger one or more of the manual light control actions of the sequence at an appropriate moment when the presence sensor or light switch is placed at the presence sensor or light switch location, automatically in the case of the presence sensor. Step 107 comprises outputting the presence sensor or light switch location determined in step 105 to a user to facilitate the installation of the presence sensor or light switch.

The method of FIG. 7 may be performed when a consumer adds a new presence sensor or light switch to the networked lighting system. With this method, the determination of what the most effective location would be to place the presence sensor or light switch may be based on how many user actions (e.g. pushing buttons) can be avoided and/or based on the level of certainty that the associated actions which are then triggered by the sensor are the desirable actions. This level of certainty may be high when the presence sensing highly correlates with the actions to be taken. However, since the presence sensor or light switch has normally not been installed yet, the location of the light control device used to trigger the light control action, or the location of the controlled lighting device, may be associated with the light control action(s) instead.

The performance of the method of FIG. 7 is further explained with the help of an example. In this example, at least three sequences of regularly occurring sequences are detected based on the control history:

A. turn porch light on, turn hallway downstairs light on, turn lavatory light on, turn lavatory lamp off, turn living room light on, turn kitchen lamp on;
B. turn hallway light on, turn study room light on;
C. turn bedroom light on, turn upstairs hallway light on, turn downstairs hallway light on, turn lavatory light on, turn lavatory light off, turn hallway downstairs light off, turn hallway upstairs light off, turn bedroom light off.

Sequence A is performed regularly when the user arrives home. Sequence B is performed regularly when the user goes to his study room. Sequence C is performed regularly during the night. Sequence A comprises six actions, sequence B comprises two actions, and sequence C comprises eight actions. If the determination of the most effective location for the presence sensor would be based on how many user actions (e.g. pushing buttons) can be avoided, sequence C would be selected from sequences A-C.

As previously described, generally, one or more lighting devices are turned on automatically when presence is detected and are optionally turned off automatically. Generally, one or more lighting devices may be automatically turned off a) when presence is no longer detected for a certain time, b) a certain time after turning on the lighting devices, or c) when presence is detected a second time. The above count of how many use actions can be avoided is determined based on the assumption that switching off the light is also automated. For example, with respect to sequence A, the light in the lavatory may be switched off automatically after a certain time, e.g. after ten minutes. If the light in the lavatory cannot/is not switched off automatically, five actions of sequence A can still be automated. To trigger automatic performance of sequence A, a presence sensor may be installed on the porch.

In the above example, the likelihood that the remainder of sequence A is performed after the porch light is turned on may be 80% (independent of time), e.g. because the user does not always go to the toilet after arriving home, the likelihood that the remainder of sequence B is performed after the hallway upstairs light is turned on may be 20% (independent of time), and the likelihood that the remainder of sequence C is performed after the bedroom light is turned on may be 90% between 2 am and 6 am, and may be 50% independent of time, for example.

If the determination of the most effective location for the presence sensor would be based on the level of certainty that the associated actions which are then triggered by the presence sensor are the desirable actions, then sequence C is selected if the networked lighting system can be programmed to perform the sequence C only when presence is sensed in the bedroom between 2 am and 6 am. If this is not possible, sequence A may be selected.

Subsequences of sequences may be considered as well. For example, if the lavatory light needs to be switched off manually, the following subsequences of sequence A may be considered:

D. turn hallway downstairs light on, turn lavatory light on, turn living room light on, turn kitchen light on;
E. turn lavatory light on, turn living room light on, turn kitchen light on;
F. turn living room light on, turn kitchen light on;

The likelihood that the remainder of sequence D is performed after the hallway downstairs light is turned on may be 80% (independent of time), the likelihood that the remainder of sequence E is performed after the lavatory light is turned on may be 30% (independent of time), and the likelihood that the remainder of sequence F is performed after the living room light is turned on may be 85%

(independent of time). If only the likelihood that the control action is being performed as part of the sequence, e.g. the likelihood that turning the lavatory light on is followed by the remainder of sequence E, is considered, then sequence F may be selected instead of sequence A. However, in this case, it is beneficial to consider the quantity of control actions in the sequence, i.e. the quantity of control actions that can be avoided, as well.

A merit of a sequence may be determined by calculating a weighted sum of the likelihood and the quantity of control actions to be automated. Alternatively or additionally, a sequence may be required to have a minimum likelihood. If the above-mentioned sequences A-C are considered and the minimum required likelihood is 70%, the merit of sequence B may be set to zero, because it only has a likelihood of 20%. The merit of sequences A and C may be set to the quantity of control actions in the sequences, e.g. to six and eight, respectively. In this case, sequence C is selected.

Alternatively, the merit of sequences A and C may be calculated as a weighted sum of the likelihood and the quantity of control actions to be automated. For instance, one point may be assigned to each control action to be automated and one point may be assigned to each (full) 10% difference between the likelihood of the sequence and the minimum required likelihood. This would result in a score of 7 (6+1) for sequence A and a score of 10 (8+2) for sequence C if sequence C can be programmed to automatically be performed when presence is sensed in the bedroom between 2 am and 6 am. In this case, sequence C is selected.

When automatically configuring the networked lighting system or proposing a configuration for the networked lighting system, not only the lighting devices which should be automatically turned on (and optionally automatically turned off) may be determined, but also the time period(s) during which the lighting devices should be automatically turned on. Furthermore, the light settings (e.g. color, light output level) and/or the setting for automatically turning off lights (e.g. disabled, after 10 minutes) may be determined based on the control history. Other parameters than time may be considered when determining whether to automatically perform a sequence upon detecting presence. For example, sequence A may only be performed automatically upon detecting presence on the porch if the user's home/away setting (which may be set manually or automatically) is set to away.

In the above examples, the location of only one presence sensor is suggested. However, it may sometimes be beneficial to suggest the placement and locations of multiple presence sensors. For example, if the likelihood that the remainder of sequence A is performed after the porch light is turned on is not 80% but 40%, but the likelihood that the remainder of sequence A is performed after both the porch light and the hallway downstairs light are turned on is 95%, the installation of presence sensors on the porch and in the hallway downstairs (with a sensing range that covers a user entering via the front door) may be suggested. Furthermore, the network lighting system may be programmed to turn on the porch light automatically if presence is detected on the porch and then perform the remainder of sequence A if presence is subsequently detected in the hallway downstairs.

In the above situation, it is also possible to suggest the placement of a single presence sensor in the hallway downstairs, with a sensing range that covers a user entering via the front door, and program the network lighting system to perform the remainder of sequence A if the porch light is switched on manually and presence in the hallway downstairs is detected right after the porch light has been switched on. In the latter case, five control actions are automated instead of six. The embodiments of FIGS. 5 to 7 differ from each other in multiple aspects, i.e. multiple steps have been added or replaced. In variations on these embodiments, only a subset of these steps is added or replaced and/or one or more steps is omitted. For example, or more of steps 121-125 may be omitted from the embodiment of FIG. 5 and/or added to the embodiments of FIGS. 6 and/or 7.

Figure 8:
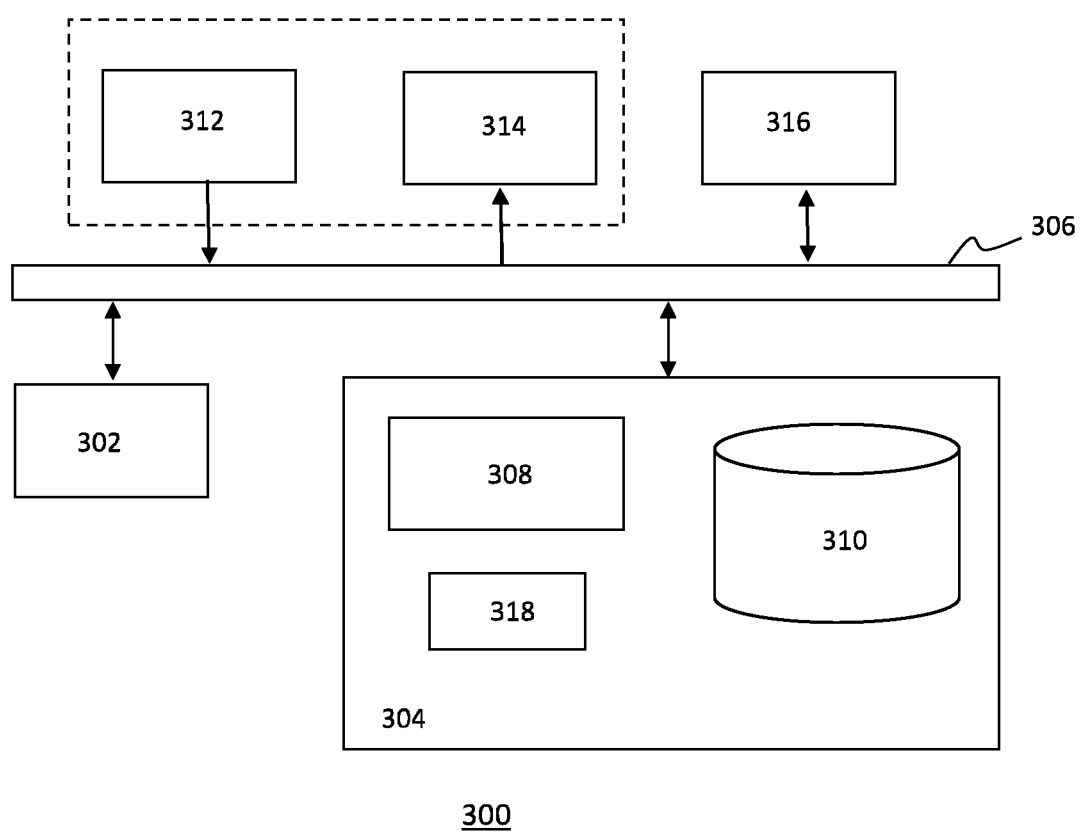
FIG. 8 is a block diagram of an exemplary data processing system for performing the method of the invention.

FIG. 8 depicts a block diagram illustrating an exemplary data processing system that may perform the method as described with reference to FIGS. 5 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for facilitating installation of a presence sensor or light switch in a networked lighting system, said networked lighting system comprising one or more lighting devices, said system comprising:
   at least one input interface;
   at least one output interface, and
   at least one processor configured to:
      obtain, via said at least one input interface, a control history of said one or more lighting devices, said control history describing a plurality of light control actions,
      detect a regularly occurring sequence of manual light control actions based on said control history, said sequence of manual light control actions comprising a light control action associated with a location,
      determine a location for said presence sensor or light switch based on said location associated with said light control action,
      program said networked lighting system to trigger said one or more light control actions upon detecting presence with said presence sensor or detecting interaction with said light switch, such that said network lighting system is able to trigger one or more of said manual light control actions of said sequence upon detecting presence with said presence sensor or detecting interaction with said light switch when said presence sensor or light switch is placed at said presence sensor or light switch location, and
      output said presence sensor or light switch location to a user via said at least one output interface to facilitate said installation at said presence sensor or light switch location of said presence sensor or light switch.

2. A system as claimed in claim 1, wherein said at least one processor is configured to:
   determine, from said control history, a subset of said one or more lighting devices, said subset being associated with said one or more light control actions, and
   program said networked lighting system to control said subset of lighting devices upon detecting presence with said presence sensor or detecting interaction with said light switch.

3. A system as claimed in claim 2, wherein said at least one processor is configured to:
   determine, from said control history, a light setting associated with at least one of said one or more light control actions, and
   program said networked lighting system to control at least one of said subset of lighting devices according to said light setting upon detecting presence with said presence sensor or detecting interaction with said light switch.

4. A system as claimed in claim 2, wherein said at least one processor is configured to:
   determine, from said control history, one or more time periods associated with said sequence, and
   program said networked lighting system to control said subset of lighting devices upon detecting presence with said presence sensor or detecting interaction with said light switch in said one or more time periods.

5. A system as claimed in claim 1, wherein said at least one processor is configured to:
   determine a likelihood that said control action is being performed as part of said sequence when said control action is performed in one or more time periods associated with said sequence, and output said presence sensor or light switch location to said user upon determining that said likelihood exceeds a threshold.

6. A system as claimed in claim 1, wherein said at least one processor is configured to:

detect a regularly occurring further sequence of manual light control actions based on said control history, said further sequence of manual light control actions comprising a further light control action associated with a further location, determine a merit of said sequence and a further merit of said further sequence, and select said sequence upon in dependence on said merit exceeding said further merit.

7. A system as claimed in claim 6, wherein said at least one processor is configured to:

determine said merit of said sequence by determining a likelihood that said control action is being performed as part of said sequence when said control action is performed in one or more time periods associated with said sequence, and determine said further merit of said further sequence by determining a likelihood that said further control action is being performed as part of said further sequence when said further control action is performed in one or more time periods associated with said further sequence.

8. A system as claimed in claim 6, wherein said at least one processor is configured to:

determine said merit of said sequence by determining a quantity of said one or more light control actions, and determine said further merit of said further sequence by determining a quantity of one or more further light control actions of said further sequence to be triggered upon detecting presence with said presence sensor or detecting interaction with said light switch.

9. A system as claimed in claim 1, wherein said location associated with said light control action is a location of at least one of said one or more lighting devices.

10. A system as claimed in claim 1, wherein said location associated with said light control action is a location of a light switch.

11. A method of facilitating installation of a presence sensor or light switch in a networked lighting system, said networked lighting system comprising one or more lighting devices, said method comprising:

obtaining a control history of said one or more lighting devices, said control history describing a plurality of light control actions;

detecting a regularly occurring sequence of manual light control actions based on said control history, said sequence of manual light control actions comprising a light control action associated with a location;

determining a location for said presence sensor or light switch based on said location associated with said light control action;

programming said networked lighting system to trigger said one or more light control actions upon detecting presence with said presence sensor or detecting interaction with said light switch, such that said network lighting system is able to trigger one or more of said manual light control actions of said sequence upon detecting presence with said presence sensor or detecting interaction with said light switch when said presence sensor or light switch is placed at said presence sensor or light switch location; and outputting said presence sensor or light switch location to a user to facilitate said installation at said presence sensor or light switch location of said presence sensor or light switch.

12. A non-transitory computer-readable medium containing programming instructions that, when run on a computer system, are configured for performing the method of claim 11.

* * * * *